United States Patent [19]

Heckethorn et al.

[11] Patent Number: 4,722,561
[45] Date of Patent: Feb. 2, 1988

[54] SEGMENTED VEE CLAMP

[75] Inventors: John E. Heckethorn, Dyersburg; Danny J. Whittle, Newbern, both of Tenn.

[73] Assignee: 3900 Corp, Baltimore, Md.

[21] Appl. No.: 78,973

[22] Filed: Jul. 29, 1987

[51] Int. Cl.⁴ .................................................. F16L 21/06
[52] U.S. Cl. ........................................ 285/411; 24/279
[58] Field of Search ............... 285/411, 410, 409, 408, 285/367, 366, 419, 253, 210, 209, 208, 405 (U.S. only), 363 (U.S. only); 24/279, 284, 285, 286, 283, 282, 280, 281; 411/85, 81

[56] References Cited

U.S. PATENT DOCUMENTS

| | | | |
|---|---|---|---|
| 48,674 | 7/1865 | George | 285/405 |
| 283,072 | 8/1883 | Camp | 285/343 |
| 2,031,054 | 2/1936 | McCarthy | 285/405 X |
| 2,379,752 | 7/1945 | Schultz | 285/209 X |
| 2,558,695 | 6/1951 | Unger | 285/363 X |
| 3,267,547 | 8/1966 | Morriss, Jr. | 24/279 |
| 3,464,722 | 9/1969 | Larkin | 285/367 |
| 3,966,240 | 6/1976 | Enomoto | 285/367 |
| 4,408,788 | 10/1983 | Beukema | 285/367 X |

FOREIGN PATENT DOCUMENTS 736879  9/1955  United Kingdom ............... 285/367

Primary Examiner—Thomas F. Callaghan
Attorney, Agent, or Firm—Dennison, Meserole, Pollack & Scheiner

[57] ABSTRACT

A stamped and welded clamp for pipe or tube joints having a plurality of arcuate segments pivotally attached to each other and separable at one location so as to facilitate wrapping about the joint. Each segment forms a Vee shaped recess on its inside face and each is formed from similar pieces projection welded together and having top and lateral reinforcing flanges. A special T-bolt serves to secure and tighten the assembly and employ a T-shaped bolt and which fits slidably into a mating housing having a stepped end-face to serve to restrain the bolt from turning during tightening.

9 Claims, 8 Drawing Figures

SEGMENTED VEE CLAMP

BACKGROUND OF THE INVENTION

1. Field of the Invention

Our new invention is directed to the art of metal clamps for securing together in gas-tight relationship, sections of flared or flanged tubing or pipes.

Specifically, we have developed a simple stamped steel welded Vee clamp having pivotally interconnected segments and a quickly joined T-bolt lock for detachably fastening the free ends of the clamp to each other for subsequently drawing the pipe sections into tight sealing engagement.

2. Description of the Prior Art

It is well-known in the prior art to clamp gas or fluid carrying tubular pipes together by utilizing external segmented clamps. Additionally, Vee type clamps have been used on aircraft engine and large diesel truck exhaust joints for many years as well as in the food processing and chemical industries. A typical clamp of this type is made from a flat steel band to which are attached two or more Vee segments. Such clamps are available from R. G. Ray Corp. of Schaumberg, Ill., Clampco Products Inc. of Wadsworth, Ohio and many others. An example of a segmented Vee clamp is shown in the patent of Leighty, U.S. Pat. No. 1,093,868.

Although these clamps are effective, the manufacturing costs are excessive for them to be regularly utilized on high production passenger cars and light trucks.

Many of the existing clamps of this type do not have sufficient strength for high performance use for securing a flared exhaust pipe to an engine exhaust manifold. Further, prior art clamps including those known as Marman clamps require a considerable time to install on a pipe joint and excessive effort to install in a tight and crowded space frequently resulting in damage when the clamp is opened.

OBJECTS OF THE INVENTION

The present invention has for its principal object the provision of an improved and relatively inexpensive stamped steel welded Vee clamp having a plurality of pivotally interconnected arcuate segments.

Another object of the invention is to provide a Vee clamp formed of a plurality of welded and pivotally interconnected segments that include a peripheral reinforcing flange.

A further object of our invention is to fabricate a high performance pipe or tube clamp from relatively simple and inexpensive steel stampings which are projection welded and riveted into a three-segment assembly.

Yet a further object of the invention is to provide a novel bolt head and bolt receiving housing furnished with a special stop shoulder configuration which permits one handed tightening of the securing nut on the bolt shank and which locks the T-bolt head from rotation during tightening.

Another object is the provision of an inexpensive yet strong segmented pipe clamp which is safe and efficient in use. Further objects and advantages of the invention will be apparent from a consideration of the detailed specification and claims.

SUMMARY OF THE INVENTION

In accordance with the present invention, we have provided a clamp construction of reinforced design including a plurality of pivotable stamped steel welded segments adapted to be wrapped about and conform to adjoining end flanges or flares of a pipe joint. In order to secure the clamp in a fluid tight seal about the joint, one end segment carries a bolt head receiving housing and another segment carries a cylindrical bolt housing. A special T-bolt having a tightening nut threaded on one end passes through the bolt housing and has its head releasably received within the other housing. a special step configuration on the face of the bolt-head receiving housing restrains the bolt from rotation during tightening.

DESCRIPTION OF THE PREFERRED EMBODIMENT

Figure 1:
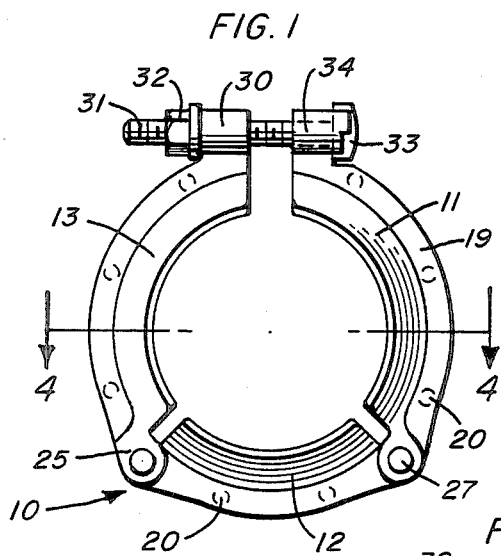
FIG. 1 is a plan view of an assembled Vee clamp of our invention.
Figure 2:
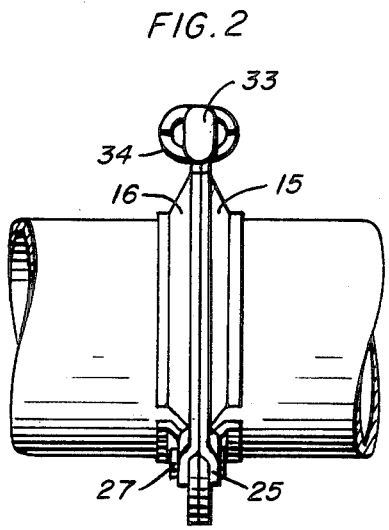
FIG. 2 is a side elevation taken from the right side of FIG. 1, showing the clamp assembled on a pipe joint.
Figure 3:
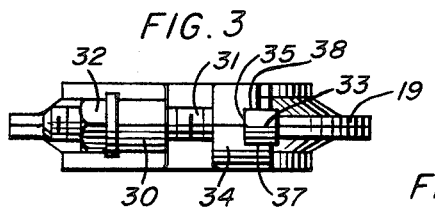
FIG. 3 is a top view of the clamp.

Our new clamp is shown generally at 10 and includes the arcuate segments 11, 12 and 13 although it is contemplated that two, four or even more could be used if desired. Each segment is fabricated from a pair of mating steel stampings 15 and 16 each of which have an arcuate outwardly extending short flange 17, an angled face 18 and a vertical reinforcing flange 19. In a typical clamp S.A. E. J1392 steel having a thickness of 1.8 mm can be used.

The steel stampings can be joined by projection welding about the reinforcing flange 19 as shown at 20 for example in face to face relationship. Weld projections (not shown) may be provided on one of the stampings as is conventional in the welding art. It will be noted that the included angle between the two faces 18 coincides with the angles provided on the engine exhaust pipe and manifold, whether cast or welded steel. A 40 degree angle is commonly found in practice. The resulting Vee shaped recess will, as hereinafter explained, receive the joint to be clamped in a secure and gas-tight manner.

Figure 6:
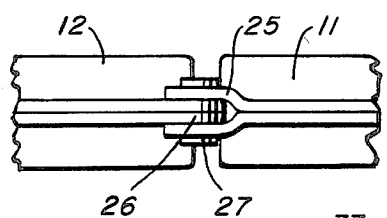
FIG. 6 is an enlarged side view of a pivotal tank connection between two clamp segments.

In order to provide for pivotal connection of the segments to each other, each of the segments 11 and 13 is provided on one free end with a pair of spaced rivet receiving ears 25, each being integral with one of the stampings 15 and 16. The central segment 12 has a pair of closely spaced rivet receiving lugs 26 on each of its ends, (see FIG. 6), so as to be received freely within the ears 25 of segments 11 and 13. A rivet 27 serves to complete the pivotal assembly and passes through ears 25 and lugs 26 and has a head formed on each end thereof to retain the same therein.

Figure 7:
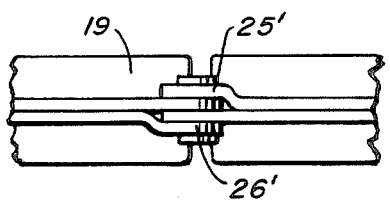
FIG. 7 is an enlarged side view of a modified pivotable tang connection between two clamp segments.

An alternative pivotal construction is shown in FIG. 7, wherein each segment has an offset ear 25' and a straight lug 26'. Rivet 27 passes through the ear and lug in the same manner as in the FIG. 6 construction.

Figure 8:
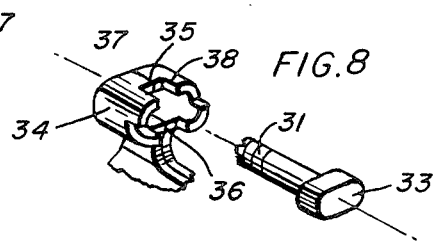
FIG. 8 is a perspective view showing the end of the T-bolt and the special configuration of the face of the bolt-head receiving housing.

The rapidly openign T-bolt construction is depicted in FIGS. 1-3 and 8. The segment 13 is formed with a cylndrical bolt receiving housing 30. Each of the steel stampings 15 and 16 is formed with semicylindrical formations which when welded together form the housing 30. A specially designed T-bolt has a threaded shank 31 which passes through housing 30 and has a flange nut 32 threaded on the free end thereof. The other end of the shank has a T-head 33 formed thereon with squared corners or with rounded corners as seen in FIG. 8. Flange nut 32 is of the prevailing torque type which firmly grips the threaded shank 31 of the bolt. This serves to retain the nut thereon during shipment and handling. It also serves the important function of enabling the Vee Clamp installer to grip the nut, rotate the T-bolt to the correct position, insert the T-head 33 through the housing as described hereafter, and rotate the bolt clockwise into its final position. If a free-running nut rather than a prevailing torque type were used, the nut itself would rotate, making it necessary to physically grip the threaded end of the bolt during installation.

The segment 11 is formed on its other end with an oval T-bolt receiving housing 34 formed from each of the stampings and welded together. The configuration of housing 34 is such that when the T-bolt head 33 is in its horizontal orientation as in FIG. 8, it will be able to pass longitudinally through the housing. When the head is rotated even a short distance after such insertion, it will abut the outer face of the housing and cannot be withdrawn. In order to more positively lock the T-bolt head against rotation to a withdrawal position, an upper and lower slot are cut in the housing as at 35 and 36 to provide stop shoulders 37 and 38 against which the T-bolt head will abut. It will be noted that shoulder 37 is slightly deeper than shoulder 38. This serves to hold the bolt from rotation during tightening of nut. The shorter shoulder 38 has been found to be adequate when loosening. If the steps or shoulders were omitted, The T-bolt head would have to be precisely positioned before torquing of the nut.

Figure 4:
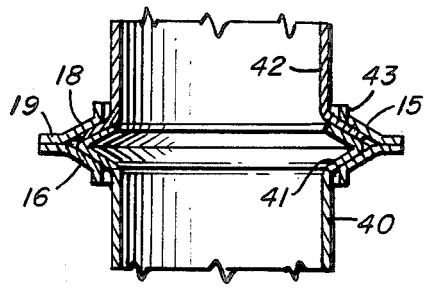
FIG. 4 is a sectional view taken along line 4—4 of FIG. 1 but showing the clamp installed in a pipe-to-pipe joint.

In use on a welded pipe-to-pipe joint such as shown in FIG. 4, the formed end 40 of a welded steel manifold has an inturned bell shape end 41. The flared inlet or exhaust pipe 42 is provided with a mating flare 43 which fits flush against the outer face of the manifold bell 41. The clamp 10 which is opened is wrapped about the joint, the T-head of the bolt then inserted in the oval housing 34 and the nut 32 then torqued. As nut pressure increases, the segments are drawn radially inwardly and the Vee recesses of the clamp segments create radially inward pressure on the joint to effect a gas tight seal.

Figure 5:
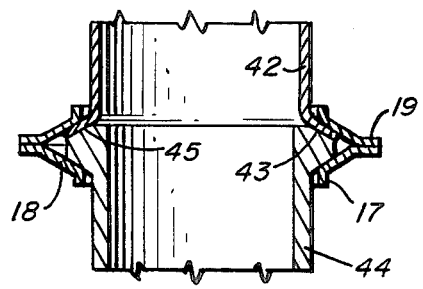
FIG. 5 is a sectional view similar to FIG. 4 but in use on a cast-iron manifold to flared-pipe connection.

Use of the clamp with a cast-iron manifold 44 is shown in FIG. 5. Here the cast end has a tapered end face machined as at 45 against which the flared end 43 of the pipe 42 is designed to rest. Otherwise the operation of the clamp on a joint of this type is the same as that already described.

What is claimed is:

1. A quick-release segmented Vee clamp for securing tubing in end-to-end gas-tight relationship, comprising a plurality of arcuate segments each being pivotaly connected to the adjacent segment and having one of the segments joined to another by means of a quick disconnect T-bolt, each segment being formed of stamped sheet metal pieces defining a Vee shaped recess therebetween and having a radialy extending flange, the pieces being welded together about the flange, and outwardly extending reinforcing means on each piece, said one of the segments having a tubular housing formed on a free end thereof, the shank of said bolt passing therethrough and having a nut threaded thereon, the said another segment having a generally rectangular housing having a height less than its width and adapted to receive the head of the T-bolt in one position of the bolt but restraining the T-bolt head from withdrawal in another position of the bolt.

2. A quick-release segmented Vee clamp as defined in claim 1, wherein the pieces are joined together by projection welding.

3. A quick-release segmented Vee clamp as defined in claim 1 and including three segments.

4. A quick-release segmented clamp as defined in claim 3, wherein the pivotal connection between adjacent segments comprises a pair of spaced ears on the end of one segment and a pair of lugs in face-to-face contact on the adjacent segment and pivot pin means passing through said ears and lugs.

5. A quick-release segmented clamp as defined in claim 3, wherein the pivotal connection between adjacent segments comprises a pair of spaced ears on the end of one segment and a pair of spaced ears on the adjacent segment, each set of ears being offset from each other, and pivot pin means passing through said ears.

6. A quick-release coupling for securing and tightening a segmented pipe or tube clamp, said clamp having a cylindrical housing on one end thereof and an oval housing on the other end thereof, threaded bolt means passing through said cylindrical housing and having a nut thereon adapted to contact the outside of the cylindrical housing, said bolt means having a T-shaped head on one end thereof adapted to slide freely through said oval housing when the T-head is oriented properly with the longer dimension of the oval housing, notch means on the outer face of said oval housing for receiving the inside face of the T-head aftre the T-head is inserted through the oval housing and rotated therein, so as to lock the bolt from further rotation during torquing of said nut.

7. A quick-release coupling as defined in claim 6, wherein a pair of notch means are provided on said outer face of the oval housing said notch means being on opposite sides of said outer face.

8. A quick-release coupling as defined in claim 6, wherein said notch means has two sides generally transverse to said outer face of the oval housing, one side being longer than the other.

9. A quick-release coupling as defined in claim 6, wherein said nut includes frictional retaining means thereon which may be used to manually rotate, insert and finally position said bolt during installation.

* * * * *